Figure 1:
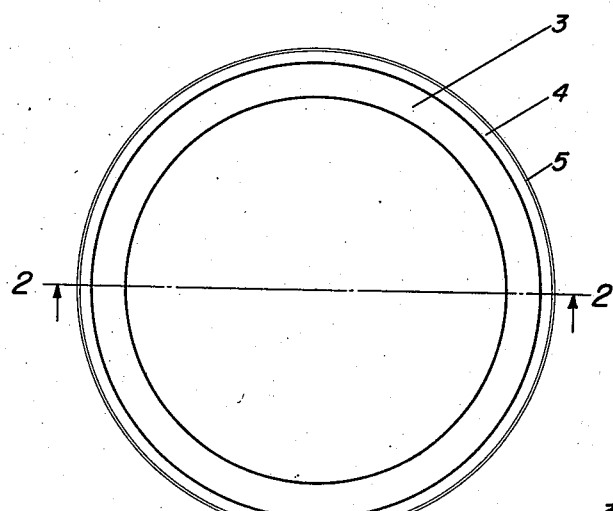

Oct. 15, 1940.  K. D. WILLIAMS  2,217,719

PROTECTION OF STEEL SHAFTING AGAINST CORROSION

Filed Sept. 27, 1938

INVENTOR
KARL D. WILLIAMS
BY
Ransom K. Davis
ATTORNEY

Patented Oct. 15, 1940

2,217,719

UNITED STATES PATENT OFFICE 2,217,719

PROTECTION OF STEEL SHAFTING AGAINST CORROSION

Karl D. Williams, Washington, D. C.

Application September 27, 1938, Serial No. 231,944

1 Claim. (Cl. 91—68)

(Granted under the act of March 3, 1883, as amended April 30, 1928; 370 O. G. 757)

This invention relates to a method of protecting steel shafting exposed to the corrosive action of salt water, by metal spraying thereon an inner coating of cadmium or zinc, and applying, by dipping, spraying or brushing, over the sprayed metallic surface, an outer coating of varnish, or the like.

The spraying of a protective coating of cadmium, zinc or other corrosion-resisting metals on steel materials exposed to corrosion by sea water is well known to the art, but such coatings are porous, and unless they are of prohibitive thickness, permit the sea water to which exposed to reach the base metal beneath. When sea water reaches the junction of the metallic coating and the base metal, active electrolytic corrosion occurs of either the coating or the base metal, depending upon which is electronegative to the other. However, the application of varnish over this sprayed metallic coating, by either dipping, brushing or spraying, forms an impervious coating over the sprayed metal and fills all voids, pores and crevices therein by capillary action. Due to the peculiar physical surface of the sprayed metal, varnish adheres thereto with unusual firmness. As the exterior varnish coating is worn away by exposure to sea water, it is replaced by a corrosion product, impervious to sea water, and continued protection results. The action of this type of protective coating is described below.

The varnish coating applied over the sprayed metal not only covers its surface but fills all voids, pores and crevices therein by capillary action. However, as the shafting to which this protective coating has been applied is rotated or otherwise placed in motion exposed to sea water, the varnish coating gradually wears away, slowly exposing the exterior surface of the sprayed metal. As the erosion of the varnish coating proceeds, the outside ends of the crevices or voids in the sprayed metal will be exposed. However, the sea water cannot enter these crevices and reach the steel shaft beneath, as the crevices are filled with varnish. Furthermore, upon exposure of the sprayed cadmium or zinc to sea water, a corrosion product, impermeable to sea water, rapidly forms on the exterior surface of the sprayed metal. Thus, as the previously applied varnish coating wears away it is replaced by this impermeable corrosion product. The sea water will eventually begin to wear away the varnish which has filled the crevices in the sprayed metal, acting progressively inward from the exterior or exposed end of the crevice. The rate of erosion within the crevice will become increasingly slower as the interior end of the crevice is approached, as the relative motion between the sea water which has penetrated the crevice and the surface of the crevice becomes less. However, the erosion within the crevice does not continue indefinitely as the corrosion products forming on the walls of the crevice soon bridge over the bottom of the crevice, and join together, to cover not only the walls of the crevice but also the varnish remaining at the bottom. The above "bridging over" occurs before all of the varnish has been worn away from the bottom of the crevice and before the steel beneath has been exposed. Thus, the entire outside surface eventually becomes covered with this impermeable corrosion product, even though some of the varnish still remains within the crevices. Though this corrosion product may in turn be eroded by the sea water, it forms again as rapidly as it is worn away.

An object of this invention is to provide a protective coating for steel shafting exposed to sea water.

Another object of this invention is to provide a protective coating for steel shafts, or other machine surfaces, such coating capable of being successfully applied without the use of heat, as in baking, where such use of heat might warp or otherwise deform the metal.

Figure 2:
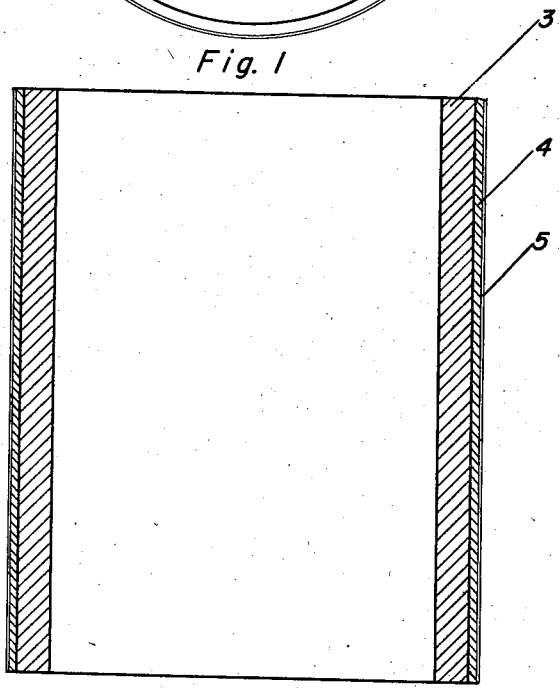

Referring to the drawing, Fig. 1 is an end view of a steel shaft with this protective coating applied, while Fig. 2 is a longitudinal cross-sectional view of the above shaft through 2—2 of Fig. 1. The steel shaft 3 is shown with an inner sprayed coating 4 and an outer varnish coating 5 applied on its exterior surface.

In applying this protective coating to a steel shaft, the shaft is first grit blasted and is then mounted in a lathe and sprayed with a coating 4 of cadmium to the thickness of about $\frac{1}{16}$ inch. Over this sprayed metallic coating 4 is then applied, by brushing, spraying or dipping, one or more coats 5 of "Bakelite" varnish. Two coats of varnish have been found satisfactory, in general. It is not necessary to bake the varnish in order to obtain a firm, adhering coat over the sprayed metallic surface. Thus, the process is especially useful in protecting steel shafts and similar machine surfaces which might be warped or otherwise deformed if another process requiring the use of heat were employed. While it is recommended that a Bakelite varnish be employed in this process, other types of varnish are also satisfactory.

One test for corrosion, consisting of rotating specimens at 1000 R. P. M., corresponding to a surface speed of 10 feet per second, for 187 days immersed in sea water, resulted in a steel shaft sprayed with cadmium, but without any varnish protection, being found very rough and pitted on the surface of the sprayed cadmium, with small areas of the steel itself exposed, at the completion of the test; while a similar specimen with two coats of Bakelite varnish applied over the sprayed cadmium showed no evidence of appreciable corrosion of the cadmium, and only apparent thinning of the varnish coat in small areas. Other tests consisting of exposing steel surfaces to salt water, such surfaces protected only by a coating of Bakelite varnish, resulted in rapid failure of the varnish coating and in corrosion of the shaft soon thereafter.

The protection obtained by the process described herein is far superior to what might be expected from the aggregate protection which the two coatings would afford thus applied one over the other.

The invention described herein may be manufactured and/or used by or for the Government of the United States of America for governmental purposes without the payment of any royalties thereon or therefor.

What I claim as my invention and desire to secure by Letters Patent is:

A method of protecting steel shafting against corrosion by sea water comprising spraying thereon a porous inner coating of cadmium to the thickness of about one-sixteenth of an inch, said inner coating having voids, pores and crevices therein, and subsequently applying over this sprayed cadmium inner coating at least one coat of a phenol formaldehyde type varnish, the varnish filling the pores, voids and crevices in and covering the surface of the sprayed cadmium until worn away and replaced by a corrosion product impervious to sea water.

KARL D. WILLIAMS.